Feb. 6, 1945.        O. A. VIELEHR ET AL        2,368,691
TARGET LOCATING DEVICE
Filed Nov. 7, 1941
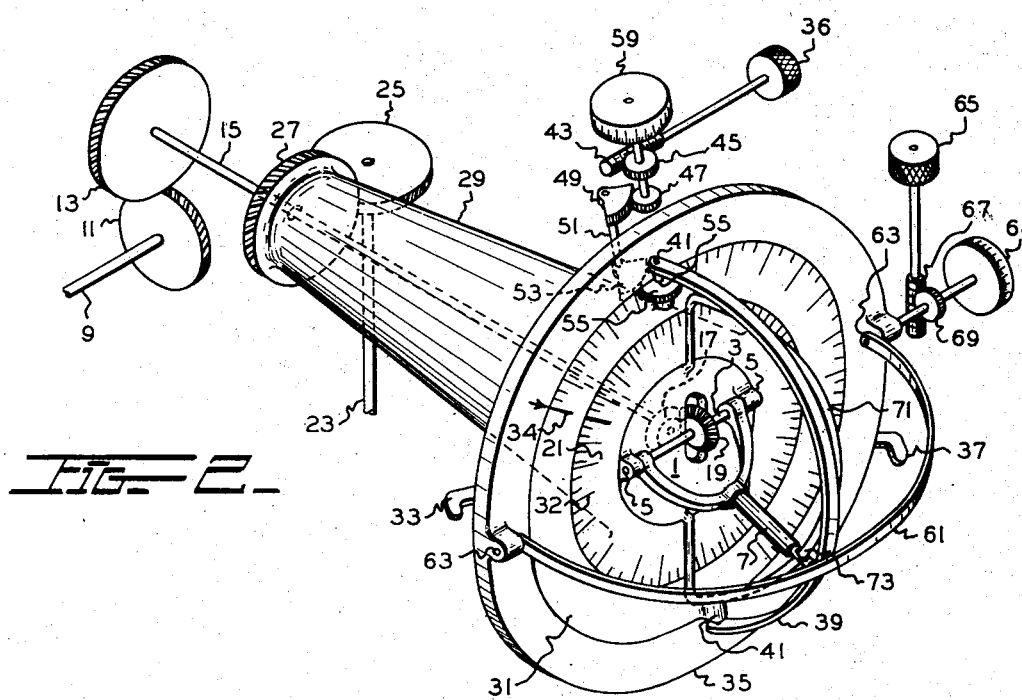
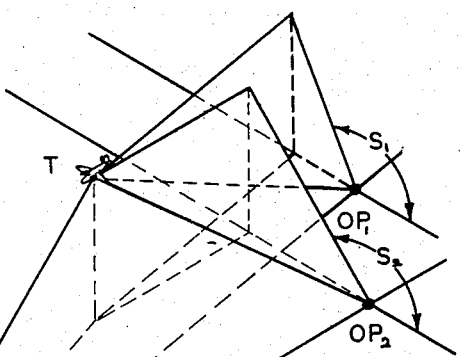
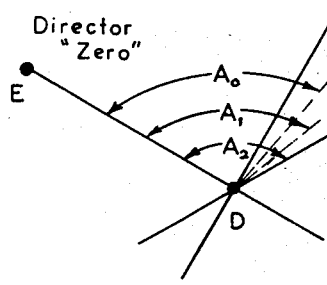
INVENTORS,
O. A. VIELEHR, C. G. UMSTED,
and A. P. GOOD;
BY
Herbert H. Thompson
their ATTORNEY Patented Feb. 6, 1945

2,368,691

UNITED STATES PATENT OFFICE 2,368,691

TARGET LOCATING DEVICE

Oscar A. Vielehr, New York, Carleton G. Umsted, Northport, and Albert P. Good, Elmhurst, N. Y., assignors to Sperry Gyroscope Company, Inc., Brooklyn, N. Y., a corporation of New York Application November 7, 1941, Serial No. 418,114

7 Claims. (Cl. 33—66)

The present invention is related to the art, concerning target locators for target sighting and/or tracking devices, such as anti-aircraft gun directors.

When it is desired to first train a sighting device, such as an anti-aircraft gun director, a searchlight, sound locator, etc., at a distant target, it is often difficult to pick up the target initially in order to be able to track with the target. The present invention is directed towards improved means for initially directing a sighting device upon a target. For this purpose two remote observation posts are used, which transmit to the sighting position, as by means of telephone, the observed slant planes of an approaching target taken with respect to the individual observation posts and the sight position. Means are provided at the sighting position for obtaining the orientation of the target in both azimuth and elevation from the slant plane data transmitted from the observation posts and from the known azimuth positions of these posts and for simply and conveniently orienting the sight device in accordance therewith.

Accordingly, it is an object of the present invention to provide an improved, convenient and easily operated device for indicating the position of a target in space.

It is another object of the present invention to provide an improved device for indicating the space orientation of a target from data transmitted from a pair of remote observation posts.

It is a further object of the present invention to provide an improved device for directing a sighting instrument toward a target which may be not yet in the field of view of the instrument.

It is still a further object of the present invention to provide an improved locating device for determining the orientation of a target as the intersection of two slant planes each containing the target, the device and one observation post at which the slant plane inclination may be observed.

Other objects and advantages will become apparent from the specification, taken in connection with the accompanying drawing wherein the invention is embodied in concrete form.

In the drawing,

Fig. 1 shows a space diagram for explaining the theory of operation of the device, and Fig. 2 shows a schematic perspective representation of the invention, especially adapted for use with an anti-aircraft gun director.

Referring to Fig. 1, point D represents the position of the anti-aircraft gun director. Located around point D and some distance therefrom are a plurality of observation posts of which two, namely, $OP_1$ and $OP_2$ are illustrated in the figure. These observation posts have known bearings or azimuthal relations $A_1$ and $A_2$ to the director position, taken with respect to an arbitrary reference zero axis DE. If it be assumed that a target is located at point T, it is desired to find the azimuth $A_0$ and elevation $E_0$ of this target with respect to the director. For this purpose each of the observation posts $OP_1$ and $OP_2$ is provided with any suitable means for determining the inclination of the slant plane containing the target T, the director D and the respective observation post $OP_1$ or $OP_2$. Thus in the figure, one such slant plane is shown as having an angular inclination $S_1$ to the horizontal and the other as having an angular inclination $S_2$, these angles being measured in vertical planes perpendicular to the horizontal lines joining the point D with the points $OP_1$ and $OP_2$ respectively. The intersection of these two slant planes is the line DT, which is the actual target orientation with respect to director D.

The target locating mechanism is shown schematically in Fig. 2 and indicates DT. It comprises a fixed central platform 1 on which is pivoted, as by pivot axis 3 and brackets 5, a locator pointer 7. Pointer 7 is adapted to be rotated in elevation in a fixed plane from the elevation control of the anti-aircraft gun director as by means of a shaft 9 connected to the director elevation control, and actuating helical gears 11 and 13, shaft 15 and bevel gear 17 actuating another bevel gear 19 fixed to the pivotal axis of pointer 7. Platform 1 supporting the pointer 7 is fastened to the casing of the instrument.

Surrounding platform 1 is a central azimuth dial 21 which is adapted to be rotated from the azimuth control of the director as by a shaft 23 connected to the director azimuth control and actuating a helical gear 25 and a helical gear 27 connected to a cylindrical member 29 which carries the azimuth dial 21. Dial 21 may be a ring surrounding platform 1, or an apertured platform placed below platform 1.

Rotatably supported about azimuth dial 21 is an inner ring 31 which may be set relative to azimuth dial 21 and locked with respect to dial 21 as by means of any suitable type of locking device 33. Surrounding inner ring 31 is an outer ring 35 which is positionable with respect to inner ring 31 and may be locked in any set position as by locking device 37. When locks 33 and 37 are set, both rings 31 and 35 rotate together with central dial 21.

Inner ring 31 carries a rotatable semi-circular bail 39 which is symmetrically pivoted on a diameter of ring 31 as at pivots 41. Bail 39 is adapted to be rotated about its pivotal axis by means of a control 36 operating through a worm 43, worm wheel 45, pinion 47, gear sector 49, cross shaft 51, gear sector 53 and pinion 55 fastened to the pivotal shaft 57 of the inner bail 39. An indicator 59 cooperating with a fixed index serves to indicate the angle of inclination of the plane of ball 39 with respect to the plane of central dial 21.

In a similar way, outer ring 35 carries an outer ball 61 pivotally and diametrically mounted thereon as by pivots 63, which outer ball 61 is adapted to be rotated about its pivotal axis 63 as by a control 65 operating through worm 67 and gear 69 connected to the pivot 63 of outer ball 61. A second indicator dial 68 shows the inclination of ball 61.

In operation, inner ring 31 is set with respect to center azimuth dial 21 at the angular position corresponding to the azimuth $A_1$ of the first observation post $OP_1$, as by means of a scale 32 on dial 21 cooperating with an index 34 on ring 31. The outer ring 35 is then set with respect to the inner ring 31 at the angle corresponding to the difference between azimuths $A_1$ and $A_2$ of the two observation posts, as by a scale 38 on ring 31 cooperating with index 40 on ring 35. Alternatively, outer ring 35 may be set directly with respect to the azimuth dial 21 at a setting corresponding to the azimuth $A_2$ of the second observation post $OP_2$. In this way, the pivotal axis of ball 39 corresponds to line $D$—$OP_1$, and that of ball 61 to line $D$—$OP_2$ of Fig. 1.

The readings of the angles between the slant planes and the horizontal $S_1$ and $S_2$ made at the two observation posts $OP_1$ and $OP_2$ are transmitted to the operator of the device, as by telephone, and the operator thereupon positions the balls 39 and 61 at the same angles $S_1$ and $S_2$, respectively, with respect to the plane of dial 21. When this is done the planes of the two balls are in the same angular relationship as the two slant planes and may be considered to represent these planes so that the intersection of the balls themselves makes the same angle with the plane of dial 21 that line DT does with the horizontal and therefore, relative to dial 21, may be considered a reproduction of the line DT.

Pointer 7 is constrained by its mounting to repeat the angular setting of the director elevation telescope in a fixed plane i. e., the plane perpendicular to its axis of rotation. To cause the director tracking telescopes to be pointed in the direction of the line DE, defined by the intersection of the two slant planes, the director azimuth handwheel is operated, and its motion transmitted by way of shaft 23, to rotate azimuth dial 21 and associated rings 31, 35 and balls 39, 61, to a position bringing the intersection of balls 39, 61 into the plane of rotation of pointer 7. Simultaneously the director elevation handwheel is rotated to position pointer 7 with its tip adjacent the intersection of the balls. When the axis of pointer 7 is thus brought into coincidence with the intersection of the planes of balls 39, 61 the target should be in the fields of view of the tracking telescopes so that normal tracking of the target by the azimuth and elevation operators may commence without preliminary searching for the target.

For the purpose of assisting and facilitating the positioning of pointer 7 upon the apparent intersection of the two balls, platform 1 carries a fixed semicircular ball 71 whose plane is perpendicular to that of azimuth dial 21 and contains the plane of motion of pointer 7. Pointer 7 is adapted to be guided along semicircular ball 71 as by riding upon it, as shown at 73.

By this device, the azimuth operator of the gun director can position dial 21 and rings 31 and 35 clamped thereto to cause the intersection of balls 39 and 61 to lie in the plane of and adjacent ball 71 independently of the positioning of pointer 7 by the elevation operator, who will position pointer 7 along guiding ball 71 so that the pointer will fall opposite the intersection of the inner and outer balls 39 and 61, thus making the actual locating much easier and quicker than if the azimuth operator had no such guiding means. In effect there are thus provided separate indexes for the guidance of the azimuth and elevation operators instead of a single index toward which pointer 7 must otherwise be directed by the coordinated efforts of the two operators.

Pointer 7 may be painted at its tip or along its entire length with luminous paint, in order to facilitate night operations.

In a modified form of this device, azimuth dial 21 and rings 31 and 35 carrying balls 39 and 61 may all be fixed to the instrument casing, while platform 1 carrying pointer 7 is made rotatable in accordance with the director azimuth.

The present device is not limited to use with an anti-aircraft director, with which it has been described for illustrative purposes only, but may be used with any sighting or tracking device, such as computing gun sights, sound locators, searchlight scanners, etc.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention, what we claim and desire to secure by Letters Patent is:

1. Apparatus for training a sighting device in azimuth and elevation upon a target when the angles of inclination of two slant planes are known, each containing the target and the location of said device and respectively including the locations of two spaced observation posts, comprising a rotatable azimuth dial, a pair of planar members supported for universal movement relative to said platform according to the azimuth angular positions of lines joining said device and each of said observation posts and the respective elevation angular positions of said target as measured from each of said observation posts to represent said slant planes, a positionable member having an axis thereof passing through the intersection of the axis of rotation of said azimuth dial, said last named member being unrestrained by said planar members, and means for positioning said last named member to cause said axis thereof to coincide with the apparent intersection of said two planar members for representing the line of intersection of said slant planes.

2. Apparatus for training a target-sighting device in azimuth and elevation, comprising a first universally supported member adjustable about a pair of mutually perpendicular axes to represent a slant plane including a sighting device, a target and a first remote station as determined by the azimuth position of a line between said device and said station and the elevation of said target as measured from said station, a second universally supported member about a pair of mutually perpendicular axes adjustable independently of said first member to represent a second slant plane including said sighting device, said target and a second remote station as determined by the azimuth position of a line between said device and said second station and the elevation of said target as measured from said second station, and a positionable pointer supported for movement to coincide with the intersection of the slant planes represented by said members whereby the azimuth and elevation position of said pointer corresponds to the azimuth and elevation angular position of said target.

3. Apparatus for training a sighting device upon a target comprising an azimuth dial rotatable about a central axis thereof, a first member having an orientable elevation axis extending diametrically of said dial, means for orienting said axis of said first member with respect to said dial about said central axis in accordance with the azimuth of a fixed remote observation post, means for positioning said first member about said axis of said member in accordance with the angular inclination of the slant plane containing said device, said target and said post, a second member having an orientable elevation axis extending diametrically of said dial, means for orienting said axis of said second member with respect to said dial about said central axis in accordance with the azimuth of a second fixed remote observation post, means for positioning said second member about said axis of said second member in accordance with the angular inclination of a second slant plane containing said target, said device and said second post, whereby the relative positions of said members indicates the intersection of said two slant planes, said two elevation axes being arranged to intersect said central axis at a common point, a third member supported for universal movement relative to said first two members about said common point to coincide with the indicated intersection of said slant planes, and means so positioning said third member and adapted to train elevate said sighting device upon said target.

4. In apparatus for training a target-sighting device in elevation and azimuth, a target locator comprising an azimuth platform representing an azimuth plane, a pair of members each having an orientable elevation axis independently rotatable about a central axis normal to said platform and each of said elevation axes for orienting said elevation axes individually according to the azimuth angular positions of a pair of spaced remote stations, said members being independently rotatable about their respective elevation axes relative to said platform according to the elevation angular position of a target as measured from said remote stations, said members being constructed and arranged to indicate by their apparent intersection a point lying in the intersection of a pair of slant planes, each including said sighting device, said target and one of said remote stations, and a pointer universally connected to said platform to permit relative movement of said pointer and said platform about the point of intersection of said intersecting axes to represent the intersection of said slant planes upon coincidence with said apparent intersection, whereby the relative positions of said pointer and said platform correspond to the azimuth and elevation orientation of said target relative to said sighting device.

5. In apparatus for training a target-sighting device in elevation and azimuth, a target locator comprising a pair of members supported for independent rotation about a pair of intersecting orientable elevation axes according to the respective elevation angles of a target as measured from a pair of spaced remote stations, said members being independently adjustable about a central axis normal to the plane of said intersecting axes for orienting each of said elevation axes according to the respective azimuth angles of lines connecting said sighting device and said remote stations, and a pointer universally coupled to said members at the point of intersection of said intersecting elevation axes to represent, upon coincidence with the apparent intersection of said members, a line between said sighting device and said target in a manner such that the relative positions of said pointer and said members correspond to the azimuth and elevation orientation of said target relative to said sighting device.

6. Apparatus for training a target sighting device upon a target whose slant planes containing the target position, the location of said device and each of two fixed observation posts are known, comprising an azimuth platform, a first ring co-planar with and rotatably mounted about said platform, a second ring co-planar with and rotatably mounted about said first ring and said platform, each of said rings carrying a semicircular bail whose diameter is pivotally and symmetrically mounted about a diameter of its ring, means for adjusting the orientation of each of said diameters with respect to said platform in accordance with the azimuth of a respective observation post, means for adjusting the inclination of each of said bails with respect to said platform in accordance with a respective one of said slant planes, a pivotally mounted pointer constrained to pivot in a plane normal to the plane of said platform and positioned centrally of said rings, means for adjusting said pointer relative to said platform according to the elevation of said device, and means for turning said rings according to the azimuth of said device, whereby said device will be trained upon said target when said pointer is directed toward the apparent intersection of said bails.

7. Apparatus for training a target sighting device upon a target whose slant planes containing the target position, the location of said device and each of two fixed observation posts are known, comprising an azimuth platform, a first ring co-planar with and rotatably mounted about said platform, a second ring co-planar with and rotatably mounted about said first ring and said platform, each of said rings carrying a semicircular bail whose diameter is pivotally and symmetrically mounted about a diameter of its ring, means for adjusting the orientation of each of said diameters with respect to said platform in accordance with the azimuth of a respective observation post, means of adjusting the inclination of each of said bails with respect to said platform in accordance with a respective one of said slant planes, a pivotally mounted pointer constrained to pivot in a plane normal to the plane of said platform and positioned centrally of said rings, and means for adjusting the relative position of said pointer and said rings in accordance with the azimuth and elevation positions of said device, whereby said device will be trained upon said target when said pointer is directed toward the apparent intersection of said bails.

OSCAR A. VIELEHR.
CARLETON G. UMSTED.
ALBERT P. GOOD.